Patented Aug. 30, 1927.

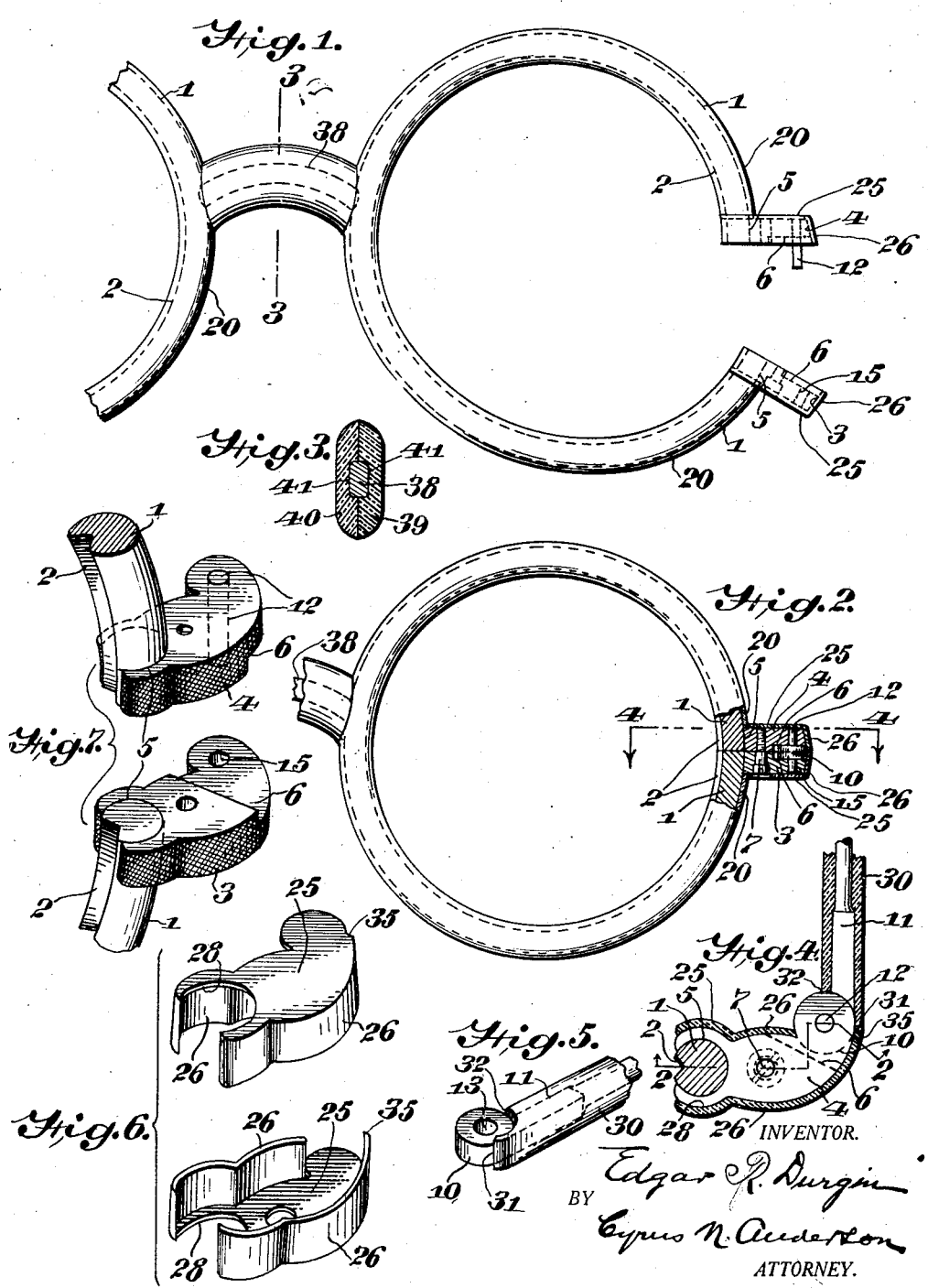

1,640,824

UNITED STATES PATENT OFFICE.

EDGAR R. DURGIN, OF NEWARK, NEW JERSEY, ASSIGNOR, BY MESNE ASSIGNMENTS, TO CONTINENTAL OPTICAL CORPORATION, OF NEW YORK, N. Y., A CORPORATION OF DELAWARE.

COMBINATION METAL AND NONMETAL SPECTACLE AND EYEGLASS FRAME.

Application filed August 16, 1924. Serial No. 732,404.

My invention relates to what are commonly and generally known as combination metal and non-metal spectacle and eye-glass frames, in which the metal frames are incased within coverings of non-metallic material such as zylonite or other suitable organic material.

Heretofore the practice has been quite general to provide the rims of metal spectacle and eye-glass frames with coverings or incasements of a non-metallic substance such as zylonite or the like. The covering of the rims only does not meet the desire of the spectacle and eye-glass wearing public for frames which have the appearance of consisting entirely of non-metallic material.

Frames which consist entirely of non-metallic material may have the ornamental effect desired by the spectacle and eye-glass wearing public, but there are certain inherent defects which cannot be overcome. One of these defects is that such frames are easily broken as compared with metal frames, and when broken render the spectacles or eye-glasses unwearable until a new frame for the lenses (in case the lenses should not be broken) shall have been obtained. Another defect of frames which consist entirely of non-metallic material is that they do not hold the lenses as securely in place and against relative movement with respect thereto as is the case with metal frames in which the lenses are mounted and held within metal rims or eye wires.

The general object of the present invention is to provide a construction of spectacle or eye-glass frame in which the appearance of a frame consisting entirely of non-metallic material is obtained, but which possesses all of the mechanical advantages inherent in and incident to a metal frame.

Another object of the invention is to provide a construction of metal frame in which all of the parts thereof are incased by or sheathed within a shell or shells of non-metallic material.

To these and other ends the invention comprehends the construction as hereinafter described in the specification and particularly pointed out in the claims and as illustrated in the acompanying drawing, in which I have illustrated one form of a convenient embodiment of the invention.

It will be understood, however, that changes in the details of construction may be made within the scope of the claims without departing from the principle or spirit of the invention.

In the drawing,—

Fig. 1 is a view in front elevation of a portion of the frame of a pair of spectacles embodying the invention;

Fig. 2 is a similar view in which a portion thereof is shown in section, the said section being taken on the line 2—2 of Fig. 4;

Fig. 3 is a transverse sectional view taken on the line 3—3 of Fig. 1;

Fig. 4 is a view taken on the line 4—4 of Fig 2;

Fig. 5 is a perspective view of the forward end portion of a temple bar;

Fig. 6 is a view in perspective of the covering members or shells of the opposite side members of a temple lug of a pair of spectacles, the said covering portions being shown in opposed relation to each other ready to be assembled upon a lug; and Fig. 7 is a view in perspective of the opposite end portions of a metal spectacle rim with the members of the temple lug secured thereto, the said opposite end portions being separated from each other.

Referring to the drawing, 1 designates the metal rims of a pair of spectacles provided with grooves 2 upon their inner edges for holding the lenses. Each of the rims is provided with metal members 3 and 4 which are secured to the end portions thereof and project outwardly therefrom. In order to secure the members 3 and 4 to the ends of the rims 1 the former are provided at their inner ends with openings 5 within which the ends of the said rims are located. The end portions of the rims and the members 3 and 4 may be secured together by brazing. Each of the lugs 3 and 4 is provided with a cutout portion 6 which cooperate when the lugs 3 and 4 are secured together by the fastening screw 7 to form a slot within which the inner end 10 of a metal temple wire 11 is pivotally secured by a metal pin 12 which is secured to the member 4. The said metal pin extends through an opening through the forward or inner end part 10 of the temple wire 11 and also through an opening 15 in the lug 3. The temple bar 11 is thus pivotally connected with the members 3 and 4, constituting the temple lug of one of the rims. It, of course, will be understood that a temple lug is provided at the opposite end of the frame.

The construction as thus far described consists entirely of metal. In order, however, to provide a construction of frame which shall have the appearance of consisting entirely of non-metal material such as zylonite, the metal rims or eye wires 1 are provided with an external shell or covering 20 of zylonite or other suitable non-metallic material. These shells may be constructed in any suitable manner, but I prefer to construct them of thin narrow strips of zylonite, the said strips being pressed and shaped so as to fit closely around the metal rims 1 with their inner edges located adjacent the outer opposite edges of the grooves 2. When the lenses are in place the opposite sides of the outer or peripheral edge portions thereof are located in close proximity to the inner edges of the shells or coverings 20 so that the metal of the rims is completely concealed.

In order to conceal the members 3 and 4, which constitute the temple lugs at the opposite ends of the frames, I have provided shells or coverings, each of which is designated as a whole by the reference number 25. These members are provided with side portions 26 which extend over the opposite edges of the members 3 and 4, while the bottoms thereof cover the outer sides of the said members; that is to say, the bottom of one of the said shells covers the top side of the member 4, while the bottom of the other shell covers the bottom side of the member 3. It will be observed that the shells 25 are each provided with openings 28 through the inner end portions of the bottoms thereof, which are slightly larger than the openings 5 in the inner ends of the members 3 and 4 to which they correspond, in order that the ends of the coverings or shells 20 upon the metal rims may project thereinto. As is apparent, the adjacent portions of the said shells will completely cover the corresponding adjacent portions of the members 3 and 4 which extend around the openings 5. When the shells 25 are placed in position upon the members 3 and 4 the inner edges thereof should contact so as to completely conceal the members 3 and 4.

Each of the metal temple wires 11 is covered by a tubular covering or shell 30, preferably of the same material as that of which the shells 20 and 25 consist. The tubular coverings or shells 30 completely inclose the respective metal temple wires 11, excepting the flattened hinge portions 10 at the inner ends thereof which are pivotally connected to the pivot pins 12.

The front end 31 of the outer side of each of the tubular shells or coverings 30 extends beyond the inner end 32 thereof, as shown in Fig. 4, and when a temple bar is in open position, as shown in Fig. 4, the forward end 31 will contact with the rear ends 35 of the outer sides of the shells 26 which cover or inclose the members 3 and 4 of the temple lugs. It will be apparent, therefore, that when a temple bar is in open position no part of the metal of the structure is visible. When, however, a temple bar is in closed position, so much of the metal as may be exposed through the gap between the edges of the ends 31 and 35 is visible, but at such time the spectacles are not being worn so that the fact that a small portion of the metal is then visible is of no consequence.

In order to secure the shells or coverings 25 upon the members 3 and 4 of a temple lug, they are placed in position thereon and are subjected to pressure. In practice these coverings or shells should be warmed so as to slightly soften the same and the edges of the members 3 and 4 should be roughened or knurled so that the elevations or projections upon the surface thereof would sink into and engage with the inner surfaces of the sides 26 of the said shells or coverings 25.

Instead of knurling or roughening the surfaces of the outer edges of the members 3 and 4, the said outer edges may be slightly tapered or inclined from their outer toward their inner contacting surfaces so that when the shells or coverings 25 are compressed thereon the said sides would slightly converge so that the inner free edges thereof would be slightly closer together than the outer edges thereof which are connected with the bottoms of said shells or coverings.

The metal bridge 38 is likewise provided with a non-metal covering, preferably consisting of two members 39 and 40, provided with grooves upon their inner sides, as indicated at 41, which are complemental to each other. The said members 39 and 40 are bent and shaped so as to conform to the shape of the metal bridge 38. When the members are placed in position upon the bridge their abutting edges are secured together by cementing or in any other suitable manner. One way of securing the same together is to apply a solvent such as acetone to the edges to soften the same and thereafter press and hold them together for a time until permanent union is effected. In like manner the opposite ends of the members 39 and 40 may be secured to the adjacent portions of the shells 20 upon the metal rims 1.

It will be seen that by my invention I have provided a combination metal and non-metal spectacle frame which possesses all of the advantages of a metal frame and likewise all of the advantages of a frame consisting entirely of non-metallic material. The metal portion of the structure affords the requisite strength and provides against breakage, while the non-metal portion thereof, which when the frame is in use completely incloses or incases the metal portion, enhances the ornamental appearance of the frame and not only meets the desire of those wishing or preferring to wear spectacles in which the frames have the appearance of non-metal frames, but also tends to prevent breakage of the lenses in case the spectacles should be dropped or otherwise subjected to a blow.

Although in the drawing I have illustrated and have described my invention as embodied in a spectacle frame, it will be understood that the principle thereof is applicable to and that the invention may be embodied in what are generally known as eye-glass frames as distinguished from spectacle frames.

The word or term "zylonite" is employed herein in a descriptive and not a limiting sense and is intended to include not only the material generally known as zylonite but also any other non-metallic substance suitable for use as shells or coverings for eye-glass or spectacle frames.

Having thus described my invention, what I claim and desire to secure by Letters Patent is:

1. A spectacle frame comprising rims, a bridge, temple lugs and temple wires all of metal, the said temple lugs respectively comprising two members adapted to be secured together, and all of the said parts being incased within shells of zylonite, the shells for the members of the said temple lugs being separate from each other and each being provided with bottom and side portions, the said side portions being adapted to engage with and to be secured to the edge portions of the said temple lug members, substantially as described.

2. A spectacle frame comprising rims, a bridge, temple lugs, and temple wires, all of metal, the said temple lugs respectively comprising two members adapted to be secured together, and shells of zylonite enclosing the said metal parts, the shells for the members of the said temple lugs being provided with bottom and side portions, the bottom portions engaging the outer sides of the said members and the sides of said shells engaging the sides of said members and being secured thereto, and the edges of the said shells facing each other and adapted to contact when the members of the said temple lugs are secured together.

3. A spectacle frame comprising rims, temple lugs and temple wires all of metal, the said temple lugs respectively comprising two members adapted to be secured together, and all of the said parts being incased within shells of zylonite, the shells for the members of the said temple lugs being separate from each other and each being provided with bottom and side portions, the said side portions being adapted to engage with and to be secured to the edge portions of the said temple lug members, substantially as described.

4. A spectacle frame comprising rims and temple lugs all of metal, the said temple lugs respectively comprising two members adapted to be secured together, and all of the said parts being incased within shells of zylonite, the shells for the members of the said temple lugs being separate from each other and each being provided with bottom and side portions, the said side portions being adapted to engage with and to be secured to the edge portions of the said temple lug members, substantially as described.

5. A spectacle frame comprising co-operating metallic end pieces having opposed cut away portions in their adjacent faces to form a temple butt receiving slot, a temple having its butt pivotally secured in said slot, a zylonite shell covering exterior surfaces of each of said co-operating pieces and being cut away at one end to expose said temple butt receiving slot, and a zylonite covering on said temple having a portion arranged to conceal said slot when the temple is in normal operating position.

6. A spectacle frame comprising co-operating metallic end pieces having opposed cut away portions in their adjacent faces to form a temple butt receiving slot, a temple having its butt pivotally secured in said slot, a zylonite shell covering exterior surfaces of each of said co-operating pieces and being cut away at one end to expose said temple butt receiving slot, and a zylonite covering on said temple having a portion arranged to overlap the ends of said cut away portions of said shells when the temple is in normal operating position.

7. A metal spectacle frame having rims provided with end pieces to which the temple wires are adapted to be pivotally connected which rims and end pieces are provided with a covering, the covering for each end piece consisting of a shell having spaced flanges and a web having one end positioned between said flanges and the other end extending beyond the ends of the flanges and with the central longitudinal axis of said other end disposed at an angle to the central longitudinal axis of the portion between the flanges and extending toward the rear from the plane of the rims of the said frame.

In testimony that I claim the foregoing as my invention I have hereunto signed my name this 1st day of August, 1924.

EDGAR R. DURGIN.